United States Patent [19]
Hallidy et al.

[11] Patent Number: 4,827,789
[45] Date of Patent: May 9, 1989

[54] LINEAR ACTUATOR

[75] Inventors: William M. Hallidy, Glendora; Robert B. Bossler, Jr., Hacienda Heights, both of Calif.

[73] Assignee: Western Gear Corporation, Lynwood, Calif.

[21] Appl. No.: 48,486

[22] Filed: May 5, 1987

Related U.S. Application Data

[63] Continuation of Ser. No. 624,609, Jun. 26, 1984, abandoned.

[51] Int. Cl.⁴ ............................ F16H 1/18; F16H 1/20
[52] U.S. Cl. ............................... 74/424.8 B; 74/89.15; 74/409; 74/441
[58] Field of Search ................... 74/424.8 R, 424.8 B, 74/89.15, 458, 457, 441, 409

[56] References Cited

U.S. PATENT DOCUMENTS

| | | | |
|---|---|---|---|
| 271,295 | 1/1883 | Anderson | 74/424.8 B |
| 1,413,982 | 4/1922 | Gill | 74/424.8 B |
| 2,205,634 | 6/1940 | Sizer | 74/441 |
| 2,502,573 | 4/1950 | Lee | 74/424.8 B |
| 2,630,022 | 3/1953 | Terdina | 74/424.8 R |
| 2,837,925 | 6/1958 | Rowley et al. | 74/424.8 R |
| 2,919,596 | 1/1960 | Kuehl | 74/441 |
| 3,124,969 | 3/1964 | Grabowski et al. | 74/441 |
| 3,449,971 | 6/1969 | Posh | 74/424.8 B |
| 3,530,734 | 9/1976 | Wray et al. | 74/424.8 R |
| 4,041,795 | 8/1977 | Rekoff, Jr. | 74/424.8 B |
| 4,186,624 | 2/1980 | Fessett | 74/679 |

FOREIGN PATENT DOCUMENTS 386809 4/1965 Switzerland ..................... 74/441

OTHER PUBLICATIONS

*Mechanical Movements* Item 260 Henry T. Brown 1893.
*Product Engineering* "20 Dynamic Applications for Screw Threads" p. 43-46 Kurt Rabe Feb. 29, 1960.
"Gearing" G. W. Michalec *Marks, Standard Handbook for Mechanical Engineers* pp. 8-98 to 8-104 1978.
507 *Mechanical Movements*, Published By Brown & Seward, New York, 1893, pp. 64-65, Item #260.
*Product Engineering*, "20 Dynamic Applications For Screw Threads" pp. 43-46, Kurt Rabe, Feb. 29, 1960.
"Gearing", G. W. Michalee, *Marks Standard Handbook For Mechanical Engineers*, pp. 8-98 to 8-104, 1978.

*Primary Examiner*—Lawrence Staab
*Attorney, Agent, or Firm*—Pretty, Schroeder, Brueggemann & Clark

[57] ABSTRACT

A linear actuator includes a single drive gear that engages two driven gears of the same pitch diameter, which in turn drive a spindle and a sleeve, respectively. The sleeve is internally threaded to receive the spindle, which is externally threaded. The sleeve and spindle are driven rotationally at slightly different rates due to different numbers of teeth on the two driven gears, producing linear motion of the spindle relative to the sleeve. The drive gear can be rotated in increments corresponding to integral numbers of teeth and the rest positions of the gears can be full engagement positions to minimize play in the gears.

15 Claims, 1 Drawing Sheet

LINEAR ACTUATOR

This is a continuation of application Ser. No. 624,609, filed 6/26/84 now abandoned.

FIELD OF THE INVENTION

The present invention relates to actuators for producing linear movement, and more particularly to such actuators that produce small movements with great precision.

BACKGROUND OF THE INVENTION

Linear actuators are devices that produce linear motion, usually in response to a rotary input. Advances in various areas of technology have created a need for actuators of increased accuracy. One area of particularly critical need relates to the positioning of lenses and mirrors used with lasers Another exemplary area is the growing of semiconductor crystals which require a precise rate of movement. A further example is high accuracy micrometers.

Many known linear actuators that are intended to be highly accurate operate on the principle of a conventional micrometer in which a spindle is threadedly received within a sleeve. The accuracy of such a device is largely dependent upon the tolerance of the threads. What is commonly referred to as a standard micrometer thread will provide linear movement with an accuracy of about 0.0001 at best. Efforts to improve this accuracy by more precise machining of the threads typically produce only a marginal gain in accuracy at substantially increased cost.

Another known approach to improving the accuracy of a linear actuator is the use of an electronic "location sensor" which detects the location of the moving actuator element and provides a feedback signal by which the position of that element is adjusted. These electronic devices not only add considerable cost and complexity, but are inherently limited by the accuracy of the sensors themselves, which is often inadequate.

An objective of the present invention is to provide a relatively simple mechanical linear actuator that can be manufactured at a reasonable cost but has very significantly improved accuracy.

SUMMARY OF THE INVENTION

The linear actuator of the present invention, which accomplishes the above objective, includes a drive gear and an arrangement for rotating the drive gear. A threaded spindle is connected to a first driven gear that engages the drive gear and a threaded reaction member is connected to a second driven gear that also engages the drive gear. The driven gears have different numbers of teeth so that they are rotated by the drive gear at different speeds, thus producing a differential rotation between the threaded members that results in relative longitudinal movement.

Preferably, the driven gears have the same pitch diameter. At least one driven gear may be of drop-tooth construction. In an exemplary form of the invention, the reaction member is a sleeve that receives the spindle internally.

A mechanism is provided for rotating the drive gear. In many instances, it is desirable that this mechanism be adapted to cause rotation of the drive gear through a discrete and predetermined angle of rotation each time it is operated. A stepper motor may be used. For best results, the angle of rotation subtends an integral number of teeth on the drive gear, and the gears may be positioned so that the drive gear comes to rest in full mesh. The positional accuracy of the gears in full mesh can be improved by enlarging the chordal thickness of the drive gear tooth forms.

The spindle ma be provided with two axially movable threaded parts and a mechanism for adjusting the distance between them to reduce the backlash permitted by the threads of the spindle and sleeve. Preferably this mechanism is resilient, thus pre-loading the threads, and it may include belleville springs.

Other features and advantages of the present invention will become apparent from the following detailed description which, taken in conjunction with the accompanying drawings, illustrates, by way of example, the principles of the invention.

DESCRIPTION OF THE PREFERRED EMBODIMENTS

Figure 1:
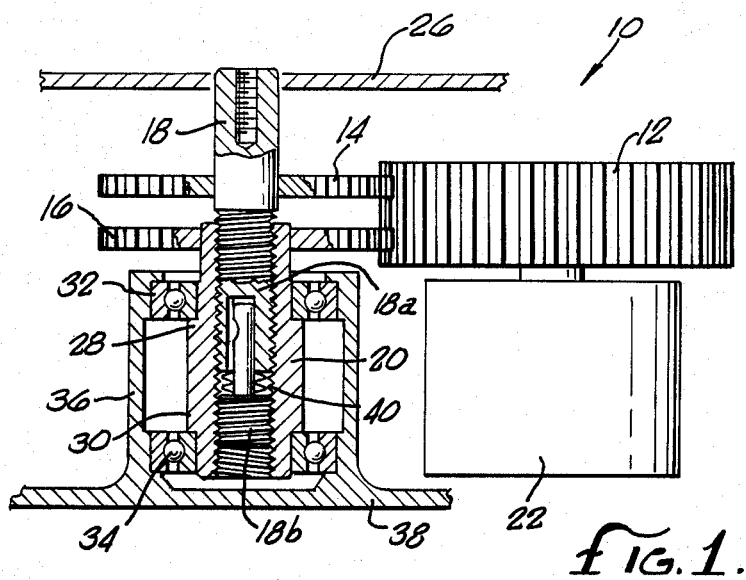
FIG. 1 is a side view of a linear actuator in accordance with the present invention, part of the mechanism being shown in cross-section.
Figure 2:
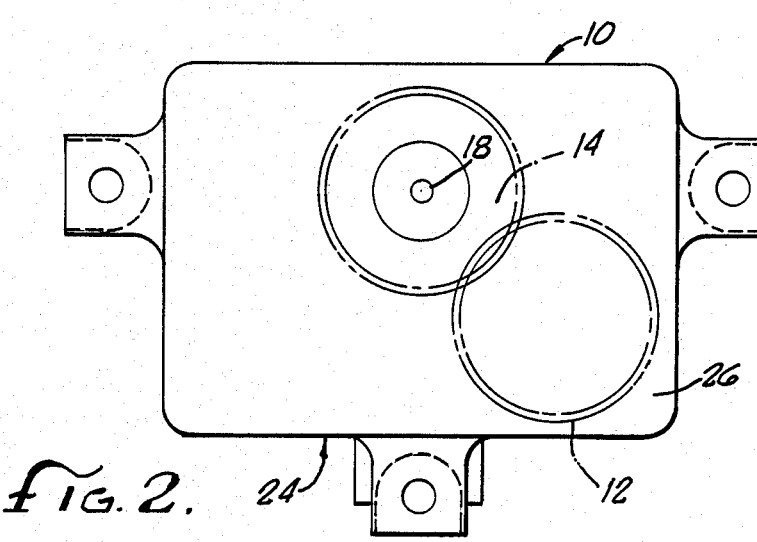
FIG. 2 is a top view of the actuator of FIG. 1.
Figure 4:
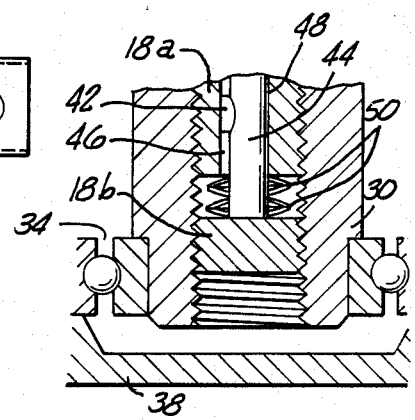
FIG. 4 is an enlarged fragmentary cross-sectional view showing part of the spindle of the actuator of FIG. 1.

A linear actuator 10, constructed in accordance with the present invention and shown in FIGS. 1, 2 and 4 of the accompanying drawings, includes a drive gear 12 that meshes with two driven gears 14 and 16 mounted on a spindle 18 and a sleeve 20, respectively. An electric motor 22 is arranged to rotate the drive gear 12. A housing 24, only fragmentary parts of which are shown in FIG. 1, encloses the mechanism and the spindle 18 is exposed through an opening in a top wall 26 of the housing.

The driven gears 14 and 16 have concentric centers that are aligned with the longitudinal axes of the spindle 18 and the sleeve 20 and cannot move rotationally or longitudinally without these members. These gears 14 and 16 are of the same pitch diameter but have different numbers of teeth, at least one of the driven gears being of drop-tooth construction so that they both accurately engage the teeth of the drive gear 12. This arrangement of a single drive gear engaging two driven gears with different numbers of teeth is inherently self-locking, i.e., the output end of the drive train cannot become an input end.

The sleeve 20 has upper and lower shoulders 28 and 30 permitting it to be located axially and radially by upper and lower preloaded angular contact bearings 32 and 34 that are held by a sleeve bracket 36 integrally formed with a base 38 of the housing 24. The sleeve 20 has a threaded internal bore 40 in which the spindle 18 is received, the spindle 18 being threaded externally. These exemplary components carry standard micrometer threads having 40 turns per inch.

Since the driven gears 14 and 16 have different numbers of teeth, rotation of the drive gear 12 will cause the spindle 18 and the sleeve 20 to turn at slightly different speeds as they rotate about a common longitudinal axis. The threaded engagement of the spindle 18 and the sleeve 20 will thus produce linear axial movement of the spindle relative to the sleeve accompanied by axial sliding motion of the first driven gear 14 across the teeth of the drive gear 12. The spindle 18 is accessible as a linear output for operation of other devices or for measurement purposes at the upper end of the spindle 18 accessible through the top wall 26 of the housing 24.

The accuracy of the actuator 10, which is of primary concern, is diminished by the backlash allowed by the threaded engagement between the spindle 18 and the sleeve 20. To minimize or eliminate this backlash, the spindle 18 is divided into two axially aligned and externally threaded parts 18a and 18b, as best shown in FIG. 4. The lower part 18b is axially movable but not rotatable with respect to the upper part 18a, the relative movement of these parts being restricted by a key 42 carried by an upwardly projecting stem 44 of the lower part 18b and a mating keyway 46 extending along a bore 48 in the bottom of the upper part 18a. Separating the upper and lower parts 18a and 18b and encircling the stem 44 are a series of belleville springs 50, which serve to push the threads of the upper and lower parts against opposite thread surfaces of the sleeve 20. In addition to eliminating backlash, the springs 50 pre-load the threads sufficiently to avoid elastic deformation when a load of lower magnitude than the pre-load is applied. The resilience of the springs 50 permits the distance between the upper and lower parts 18a and 18b to vary slightly as the spindle 18 travels within the sleeve 20, thus compensating for small variations in the pitch of the spindle and sleeve threads.

It is often desirable, depending on the use to which the actuator 10 is to be put, to cause the drive gear 12 to be advanced stepwise through a discrete incremental angle of rotation on each successive operating cycle of the motor 22. A stepper motor is used for this purpose. There are, of course, other suitable arrangements, such as a Geneva mechanism, that will accurately produce an incremental advance on each operation.

Preferably, the incremental angle of rotation chosen should be equal to that subtended by an integral number of teeth on the drive gear 12. The gears 12, 14 and 16 are positioned so that they come to rest, at the conclusion of each operating cycle of the motor 22, with the drive gear in full mesh. A gear is said to be in full mesh when the center line of a tooth lies along a line connecting the centers of that gear and a meshing gear. In this full mesh position, the play between the drive gear 12 and the driven gears 14 and 16 is minimized and the accuracy of the gear positions is maximized. When this technique is used, the accuracy of the actuator 10 can be increased further by enlarging the chordal thickness of the teeth of the drive gear 12. The play in the gears 12, 14 and 16 is then minimized in the full mesh position with a possible corresponding increase in play when the gears are differently positioned. However, it is only the play at the rest position (the full mesh position) that ultimately affects the accuracy of the actuator 10.

Figure 3:
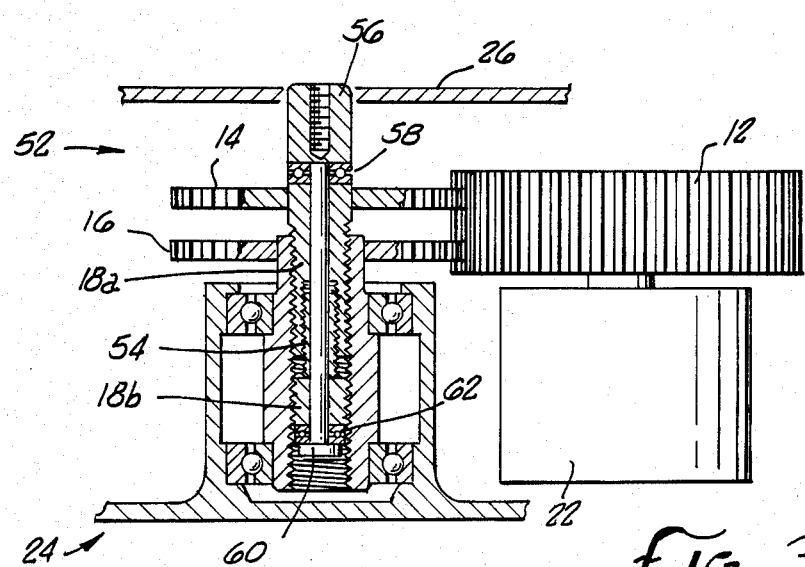
FIG. 3 is a side view, similar to FIG. 1, showing an alternative embodiment of the invention.

A second embodiment of the invention, shown in FIG. 3, is a linear actuator 52 in which similar components are identified by the same reference numbers. The lower part 18b of the spindle 18 carries an externally threaded stem 54 received by an interally threaded bore in the upper part 18a of the spindle. Set screws (not shown) are used to fix the relative positions of the upper and lower parts 18a and 18b so that they press against opposite thread surfaces. The belleville springs 50 of the actuator 10 are omitted in the actuator 52.

Another feature of the second actuator 52 not found in the first actuator 10 is the provision of an upper end cap 56 at the top of the spindle 18 exposed through an opening in the top wall 26 of the housing 24. An upper thrust bearing 58 permits this end cap 56 to rotate. A lower end cap 60 at the bottom of the spindle 18 is permitted to rotate by a lower thrust bearing 62. The spindle 18 thus provides a non-rotating linear output.

The precision of both actuators 10 and 52 is illustrated by an exemplary drive gear 12 with 24 teeth, a first driven gear 14 (mounted on the spindle 18) with 20 teeth, and a second driven gear 16 (mounted on the sleeve 20) with 21 teeth. If a single cycle of operation of the motor 22 advances the drive gear 12 15 degrees, or one tooth, the first driven gear 14 will advance one twentieth of a revolution, or 18 degrees. The second driven gear 16 will advance one twenty-first of a revolution or 17.142857 degrees. The first driven gear 14 will thus rotate 0.857143 degrees further than the second driven gear 16. If the spindle 18 and sleeve 20 each carry a standard micrometer thread of 40 turns per inch, the above difference in angular movement will produce an axial movement of the spindle relative to the sleeve of 59.5 microinches. This example can be improved upon by the use of four times as many teeth on each gear, giving the same ratios with significantly reduced tooth to tooth error.

Assuming a 96 tooth drive gear 12, the following table illustrates the axial movement of the spindle 18 relative to the sleeve 20, given various combinations of numbers of driven gear teeth.

| Number of Teeth on First Drive Gear 14 | Number of Teeth on Second Drive Gear 16 | Axial Spindle Movement (Microiches) |
|---|---|---|
| 76 | 79 | 49.97 |
| 75 | 78 | 51.3 |
| 74 | 77 | 52.65 |
| 73 | 76 | 54.07 |
| 72 | 75 | 55.56 |
| 82 | 86 | 56.7 |
| 81 | 85 | 58.1 |
| 80 | 84 | 59.5 |
| 79 | 83 | 61.0 |

In general, the actuators 10 and 52 are particularly suitable for producing precise incremental linear movements of about 50 to 100 microinches.

A precise movement of 0.000050 inches per step can be provided by letting the drive gear 12 move 6 teeth per step with 120 teeth on the first drive gear 14 and 125 teeth on the second drive gear 16. The increment of six teeth per step on the drive gear 12 can be done easily with a stepper motor, i.e., a 15° step with 144 teeth, an 18° step with 120 teeth, a 20° step with 108 teeth, a 24° step with 90 teeth, or a 30° step with 72 teeth.

It should be noted that the use of a single drive gear 12 that engages both driven gears 14 and 16 contributes significantly to the accuracy of the actuators 10 and 52. Any errors in the drive gear 12 have little or no effect on the overall accuracy of the device since they are transmitted to both the spindle 18 and the sleeve 20 simultaneously. These self-canceling errors would include tooth to tooth variations, out of round distortion, torsional wind-up and play in keyways. Moreover, the use of a single drive gear permits simultaneous full engagement of both driven gears, which is necessary if the concept of a full mesh rest position is to be employed.

While particular forms of the invention have been illustrated and described, it will be apparent that various modifications can be made without departing from the spirit and the scope of the invention. Accordingly, it is not intended that the invention be limited, except as by the appended claims.

We claim:

1. A precision actuator for producing small linear movements unaccompanied by rotation comprising:
   a drive gear;
   means for rotating said drive gear; a reaction member;
   a first driven gear engaging said drive gear;
   a second driven gear engaging said drive gear and connected to said reaction member for rotation therewith, said first and second driven gears having different numbers of teeth arranged to be driven simultaneously by said drive gear at different rotational speeds of;
   a spindle divided into first and second parts that are axially movable with respect to each other but not rotatable with respect to each other independently of said axial movement, said spindle including a stem extending from said second part through said first part, and an end cap connected to said stem on the opposite side of said first part from said second part, said spindle being threadedly engaged by said reaction member and being connected to said first driven gear for rotation therewith, whereby, upon operation of said rotating means, said spindle and said reaction member are driven at different rotational speeds and said threaded engagement causes linear movement of said spindle relative to said reaction member.

2. The actuator of claim 1 wherein said rotating means includes means for causing rotation of said drive gear through a discrete step of a predetermined angle corresponding to each operating cycle thereof.

3. The actuator of claim 2 wherein said predetermined angle subtends an integral number of teeth on said drive gear.

4. The actuator of claim 2 wherein said rotating. means is a stepper motor.

5. The actuator of claim 4 wherein said predetermined angle subtends an integral number of teeth on said drive gear.

6. The actuator of claim 1 wherein said reaction member is an internally threaded sleeve and said spindle is externally threaded.

7. The actuator of claim 1 wherein said first and second driven gears are of the same pitch diameter.

8. The actuator of claim 7 wherein the centers of said first and second driven gears are aligned with each other and with the longitudinal axes of said spindle and said reaction member.

9. The actuator of claim 1 wherein:
   said spindle is externally threaded;
   said reaction member is an internally threaded sleeve;
   the centers of said first and second driven gears are aligned with each other and with the longitudinal axes of said spindle and said reaction member; and
   said spindle extends through said sleeve to said first driven gear.

10. The actuator of claim 1 wherein one of said driven gears is of drop-tooth construction.

11. The actuator of claim 1 wherein:
    said rotating means includes means for causing rotation of said drive gear through a discrete step of a predetermined angle corresponding to each operating cycle thereof; and
    said gears are positioned so as to come to rest with said drive gear in full engagement with said driven gears upon the completion of each operating cycle.

12. The actuator of claim 11, wherein:
    one of said driven gears is of drop-tooth construction;
    said drive gear has tooth forms with an enlarged chordal thickness to cause tight engagement with said driven gears when in full engagement.

13. A precision actuator for producing small linear movements unaccompanied by rotation comprising:
    a drive gear;
    means for rotationg said drive gear through a predetermined angle corresponding to an integral number of teeth on each operation thereof;
    an internally threaded sleeve; and
    an externally threaded spindle in threaded engagement with said sleeve, said spindle having first and second threaded parts that are axially movable with respect to each other but not rotatable with respect to each other independently of said axial movement said spindle further having a stem extending from said second part through said first part
    a first driven gear mounted on said spindle , the center thereof being aligned with the longitudinal axis of said spindle and said sleeve, said first driven gear being in direct engagement with said drive gear; and
    a second driven gear mounted on said sleeve for rotation therewith, the center thereof being aligned with the center of said first driven gear, said second driven gear having the same pitch diameter as said first driven gear but having a different number of teeth, one of said driven gears being a drop-tooth gear, said second driven gear being in direct engagement with said drive gear, whereby upon operation of said rotating means said spindle and said sleeve are driven at different rotational speeds and said threaded engagement causes linear movement of said spindle relative to said sleeve, said gears being position so as to come to rest after operation of said rotating means with said drive gear in full engagement with said driven gears; and an end cap forming part of said spindle, attached to said stem and rotatable with respect to said first and second parts.

14. The actuator of claim 1 wherein said rotation means is a stepper motor.

15. The actuator of claim 1 wherein said drive gear has teeth with an enlarged cordal thickness to cause tight engagement with said driven gears when in full engagement.

* * * * *

UNITED STATES PATENT AND TRADEMARK OFFICE
CERTIFICATE OF CORRECTION

PATENT NO. : 4,827,789

DATED : May 9, 1989

INVENTOR(S) : Hallidy et al.

It is certified that error appears in the above-identified patent and that said Letters Patent is hereby corrected as shown below:

Col. 2, line 7, "ma" should be -- may --;

Col. 6, line 56, delete "1" and insert -- 13 --; and

Col. 6, line 58, delete "1" and insert -- 13 --.

Signed and Sealed this

Fifth Day of June, 1990

Attest:

HARRY F. MANBECK, JR.

*Attesting Officer*      *Commissioner of Patents and Trademarks*